United States Patent [19]
Slates et al.

[11] Patent Number: 5,850,046
[45] Date of Patent: Dec. 15, 1998

[54] TRANSDUCER MOUNTING BRACKET AND VERIFICATION DEVICE: APPARATUS AND METHOD

[75] Inventors: Rich Slates; Ron Wilson; Tom Pfoh; Larry Covino, all of Minden, Nev.

[73] Assignee: Bently Nevada Corporation, Minden, Nev.

[21] Appl. No.: 742,388

[22] Filed: Oct. 31, 1996

[51] Int. Cl.$^6$ .................................................. G01R 33/00
[52] U.S. Cl. .......................................................... 73/866.5
[58] Field of Search ................................ 73/865.8, 866.5, 73/116, 15, 627–629; 417/63; 415/118; 248/542, 205.1, 220.21, 220.22, 223.41, 225.11, 241, 295.11, 298.1, 323; 324/207.24, 207.12, 207.11

[56] References Cited

U.S. PATENT DOCUMENTS

| | | |
|---|---|---|
| 2,231,085 | 2/1941 | Morrison et al. . |
| 2,968,031 | 1/1961 | Higa . |
| 3,217,204 | 11/1965 | Nance . |
| 3,441,840 | 4/1969 | Randle . |
| 3,513,686 | 5/1970 | Soroka . |
| 3,539,912 | 11/1970 | Wardle . |
| 4,164,864 | 8/1979 | Feller . |
| 4,535,624 | 8/1985 | Ginns et al. . |
| 4,659,988 | 4/1987 | Goff et al. . |
| 4,702,101 | 10/1987 | Abbe et al. . |
| 4,771,237 | 9/1988 | Daley . |
| 4,802,661 | 2/1989 | Jewett . |
| 5,034,749 | 7/1991 | Jungblut et al. . |
| 5,065,635 | 11/1991 | Burtner et al. .......................... 73/866.5 |
| 5,081,756 | 1/1992 | Abe et al. . |
| 5,215,296 | 6/1993 | Adams et al. . |
| 5,325,734 | 7/1994 | Jordan . |
| 5,332,183 | 7/1994 | Kagayama .......................... 248/223.41 |
| 5,355,715 | 10/1994 | Rausche et al. . |
| 5,365,787 | 11/1994 | Hernandez et al. . |

*Primary Examiner*—Robert Raevis
*Attorney, Agent, or Firm*—Bernhard Kreten

[57] ABSTRACT

A transducer mounting apparatus (10) is disclosed which includes a two-piece mounting bracket (20) and a verification device (100). The two-piece mounting bracket (20) includes a precisely machined base plate (22) and sliding plate (60). At least one transducer (150) is mounted to the sliding plate (60) and the sliding plate (60) is slideably coupled to the base plate (22) for precisely mounting and slideably positioning at least the one transducer (150) adjacent a "target" to be monitored thereby. The verification device (100) couples to the base plate (22) and is employed in a method for calibrating and verifying the operation of at least the one transducer (150) prior to at least the one transducer (150) being mechanically locked into position by rigidly securing the sliding plate (60) to the base plate (22).

11 Claims, 10 Drawing Sheets

TRANSDUCER MOUNTING BRACKET AND VERIFICATION DEVICE: APPARATUS AND METHOD

FIELD OF THE INVENTION

The present invention relates generally to a transducer mounting apparatus and method, and in particular, to an adjustable transducer mounting bracket and a verification device for precisely mounting and slideably positioning a transducer adjacent a target area to be monitored and a method for calibrating and verifying the operation of the mounted transducer prior to the transducer being mechanically locked into position.

BACKGROUND OF THE INVENTION

A wide variety of applications in the industry of monitoring the characteristics of rotating machinery require at least one transducer or sensor to be internally mounted within a machine case. Typically, the transducer is supported by a bracket which is rigidly coupled to the machine case by welding it thereto or by a conventional bracket and bolt method. However, it is critical that the transducer be mounted such that the length or spacing between a "target" and the transducer remains within the linear range of the transducer for providing accurate and reliable measurements to maintain safe machine operation.

Presently, one recurring problem is to internally and rigidly mount the transducer at a precise spacing from the target being monitored by the transducer and adjusting that spacing for optimum transducer operation and calibration. When mounting the transducer current solutions used for obtaining the critical length or spacing required for accurate monitoring between the "target" and the transducer involve shimming the transducer and using parallels in an attempt to set the gap or spacing between the transducer and the target of the machine being monitored. This process is both laborious and time consuming and fails to address much less provide any type of means for calibrating and verifying the operation of the transducer during installation and periodically thereafter.

For example, one essential application for mounting a transducer within the interior of a machine is to measure the differential expansion for large steam turbines. Differential expansion is the difference between the axial expansion of a rotor and the axial expansion of a casing of the turbine. If the difference in rotor axial expansion and case expansion is too large, the turbine's rotating and stationary components come into contact and can lead to a catastrophic machine failure.

Thus, a need exists for an apparatus and method for precisely mounting and adjusting a transducer such that the length or spacing between a "target" and the transducer remains within the linear range of the transducer for providing accurate and reliable measurements and a method for calibrating and verifying the operation of the transducer during installation and periodically thereafter.

The following prior art reflects the state of the art of which applicant is aware and is included herewith to discharge applicant's acknowledged duty to disclose relevant prior art. It is stipulated, however, that none of these references teach singly nor render obvious when considered in any conceivable combination the nexus of the instant invention as disclosed in greater detail hereinafter and as particularly claimed.

| PATENT NO. | ISSUE DATE | INVENTOR |
|---|---|---|
| 2,231,085 | February 11, 1941 | Morrison, et al. |
| 2,968,031 | January 10, 1961 | Higa |
| 3,046,006 | July 24, 1962 | Kulicke |
| 3,217,204 | November 9, 1965 | Nance |
| 3,441,840 | April 29, 1969 | Randle |
| 3,513,686 | May 26, 1970 | Soroka |
| 3,525,140 | August 25, 1970 | Cachon, et al |
| 3,539,912 | November 10, 1970 | Wardle |
| 4,164,864 | August 21, 1979 | Feller |
| 4,535,624 | August 20, 1985 | Ginns, et al. |
| 4,569,988 | April 21, 1987 | Goff, et al. |
| 4,687,287 | August 18, 1987 | Lukas, et al. |
| 4,702,101 | October 27, 1987 | Abbe, et al. |
| 4,771,237 | September 13, 1988 | Daley |
| 4,802,661 | February 7, 1989 | Jewett |
| 5,034,749 | July 23, 1991 | Jungblut, et al. |
| 5,081,756 | January 21, 1992 | Abe, et al. |
| 5,215,296 | June 1, 1993 | Adams, et al. |
| 5,325,734 | July 5, 1994 | Jordan |
| 5,355,715 | October 18, 1994 | Rausche, et al. |
| 5,365,787 | November 22, 1994 | Hernandez, et al. |

The patent to Feller teaches the use of a method and apparatus for supporting a sensor in a normally inaccessible area of a machine. Referring to FIGS. 1 and 2, a rod (25) extends through a radial opening (19) disposed in a housing (16) of the machine. A lower end of the rod (25) rigidly supports a sensor (21) adjacent a radial flange (17) of a shaft (10). An upper end (26) of the rod (25) extends through the machine housing (16), a bottom plate (28) of a sealed housing (29) and a slider (33). The sealed housing (29) is rigidly coupled to the exterior of the machine housing (16). The upper end (26) of the rod (25) threadedly receives a socket cap screw (31) having a shank which passes through an opening (32) formed in the slider (33). The shank terminates into a head which is seated in a recess (30) formed in the slider (33). The slider (33) is disposed within a bored opening (36) formed in a guide block (37) which is rigidly coupled to the base plate (28). A threaded stud (71) is threadedly engaged in a threaded bushing (72) which is disposed in a sidewall of the sealed housing (29). The threaded stud (71) extends inwardly into the housing (29) and is threadedly engaged in a threaded blind bore (76) formed in an axial end face of the slider (33). Rotation of the threaded bushing (72) causes an axial movement of the slider (33) to effect a desired spacing between a face (22) of the sensor (21) and a face (18) of the flange (17). Upon attaining a desired spacing, a lock nut (81) is used to lock the slider in the adjusted position.

The patent to Daley teaches the use of a method and apparatus for calibrating a displacement probe using a polynomial equation to generate a displacement lookup table. A pre-assembled probe (10) is clamped in a calibration fixture (24) via clamp (38). The calibration fixture (24) includes a calibration target (26) and lead screws (35), (36) and (40) for aligning and selectively varying the displacement between the target (26) and the tip (22) of the probe (10). The output of the probe is read and stored at each of a plurality of pre-selected target/probe displacements. The stored output versus displacement data is then employed to generate a polynomial equation which approximates probe output as a function of displacement. A displacement versus output lookup table unique to that probe is then generated from the polynomial approximation for a multiplicity of discreet displacement increments.

The patent to Adams, et al. teaches the use of an apparatus for mechanical positioning of working material which is to be materially altered. The apparatus includes a fixed base (40), a carriage (20) and a lead screw (30) rotatable with respect to the fixed base (40). The carriage (20) translates relative to the base and moves objects coupled thereto. The exact position of the carriage (20) is indexed by first pressing a button 80a to release an inside threaded concave cylindrical clamping piece 64 between the carriage and the lead screw (30). The carriage (20) may then be manually moved to a desired location dictated by a scale (42a), (42b) disposed on the fixed base (40) to locate the carriage (20) with respect to the base (40). Once the carriage (20) is roughly located, the button (80a) is released and the carriage (20) is again clamped to the lead screw (30). The carriage (20) is finally incremented into a positioned with respect to the scale (42a), (42b) by a vernier adjustment of an indexed thumb-wheel (32) disposed at one end of the lead screw (30).

SUMMARY OF THE INVENTION

The present invention is distinguished over the known prior art in a multiplicity of ways. For one thing, the present invention provides a mounting bracket which slideably supports a transducer to easily effect accurate positioning of the transducer relative to a "target" of a machine being monitored by the transducer. In addition, the present invention includes a verification device which operatively couples to the mounting bracket and includes a micro-measuring means to precisely discern the displacement of the transducer with respect to the target. Thus, the present invention fulfills a long standing need for an apparatus and method which allows a transducer to be precisely mounted and incrementally positioned to obtain the exact length or spacing between a "target" and the transducer to obtain optimum transducer operation. Furthermore, the present invention provides an apparatus and method for calibrating and verifying the operation of the transducer during installation and periodically thereafter for maintaining accurate and reliable measurements which results in safe machine operation.

In a preferred form, a two-piece mounting bracket is provided which includes a base plate and a micro-positionable sliding plate. Typically, the base plate is attached to the case of the machine or to a standard bracket. The transducer is fastened to the sliding plate and the sliding plate is in turn fastened to the base plate, but not rigidly fastened thereto.

The base plate is of a generally elongate shape including a pair of spaced apart integrally formed trackways. The trackways are formed by a pair of longitudinally extending outwardly turned "L" shaped notches disposed on an upper surface and extending into a pair longitudinal extending side surfaces of the base plate. Thus, the trackways downwardly and outwardly extend from the upper surface of the base plate thereby giving the base plate a substantially "T" shaped cross-sectional area throughout its elongated length.

The micro-positionable sliding plate includes a pair of opposed channels rigidly maintained at a spaced apart relation with respect to one another by an integrally formed medial support means. Each channel is formed by an upwardly and inwardly diverging wall which extends from an outer longitudinal periphery of each edge of a top surface of the support means. Each channel appears as an inverted "L" shaped notch longitudinally extending along the length of the sliding plate. The upper side surface of the channel is outwardly staggered from the lower side surface of the support means to provide a transducer receiving area.

The longitudinally extending outwardly turned "L" shaped trackways in the base plate nest within the inverted "L" shaped channels of the sliding plate to provide precise movement of at least one transducer operatively coupled to the transducer receiving area of the sliding plate when in an unlocked mode.

In addition, the present invention includes a verification device which includes a verification bracket and a micro-measuring means. The verification bracket includes a pair of opposed bracket channels which are complemental in shape to the sliding plate channels but abbreviated in longitudinal length. The verification bracket when coupled to the base plate via the pair of bracket channels employs micro-measuring means operatively coupled to the bracket to precisely discern the displacement of the transducer mounted to the sliding plate with respect to the target. In addition, the verification device allows the correct operation of the transducer system to be verified during installation and periodically thereafter to maintain safe machine operation.

In a preferred form, the micro-measuring means is a spindle micrometer. The spindle micrometer is initially preset at a pre-determined measurement and then secured into the verification bracket which is slid onto and then rigidly coupled at one end of the base plate. The sliding plate is then moved so that an edge of the transducer is at a pre-determined distance from the target, for example, a collar of a rotor shaft of a machine.

A digital volt meter and a power supply are then operatively coupled to the transducer via a transducer cable. The digital volt meter outputs a voltage correlative to the distance between the transducer and the collar. The spindle micrometer is then incrementally backed off (or advanced) according to a table of values and at each value the voltage reading from the digital volt meter is recorded. In this manner, a curve of gap settings of the transducer with respect to the collar is determined from which the operation of the transducer may be verified. In addition, the verification device is used for accurate placement of the transducer with respect to the associated target. Thus, once the desired optimum machine gap setting is determined the transducer may be positioned at this location. The verification bracket and micrometer are then removed and the sliding plate is rigidly attached to the mounting plate, thus locking the transducer in place.

OBJECTS OF THE INVENTION

A primary object of the present invention is to provide a new and novel mounting bracket and verification apparatus and method for micro-positioning and rigidly supporting a transducer.

A further object of the present invention is to provide the mounting bracket as characterized above which includes a base plate and a micro-positionable sliding plate operatively coupled to the base plate.

Another further object of the present invention is to provide the micro-positionable sliding plate as characterized above which further includes a medial transducer support means.

Another further object of the present invention is to provide the mounting bracket as characterized above which includes means for one or more transducers to be pre-installed onto the mounting bracket prior to the mounting bracket being installed within a machine.

Another further object of the present invention is to provide the mounting bracket as characterized above which includes means for a transducer to slide precisely relative to a collar or ramp of a machine.

Another further object of the present invention is to provide the mounting bracket as characterized above which ensures that a transducer which is operatively coupled thereto is aligned with and perpendicular to a shaft rotor of a machine.

Another further object of the present invention is to provide the mounting bracket and verification device as characterized above which is precisionally designed and machined to provide accurate incremental movement of a transducer.

Another further object of the present invention is to provide the mounting bracket and verification device as characterized above which is durable in construction.

Another further object of the present invention is to provide the mounting bracket and verification device as characterized above which is designed for ease of use in mounting a transducer within a machine.

Viewed from a first vantage point, it is an object of the present invention to provide a transducer mounting bracket, comprising in combination: a base plate fixed with respect to a target; an adjustable sliding plate operatively coupled to the base plate and at least one transducer fixed to the sliding plate; whereby the transducer operatively coupled to said adjustable sliding plate is moveable with respect to the target being monitored by the transducer for calibrating the transducer.

Viewed from a second vantage point, it is an object of the present invention to provide a mounting apparatus for supporting a transducer which measures axial movement between a rotor and a casing of a machine, the mounting apparatus comprising in combination: a base plate coupled to an interior of the machine casing in a strategic location proximate to a target area on the rotor of the machine; a sliding plate coupled to the base plate; the sliding plate supporting the transducer such that the transducer addresses the rotor axially; whereby the sliding plate allows the transducer to be linearly translated along the length of the rotor to obtain a precise distance between the transducer and the target area prior to locking the sliding plate to the base plate.

Viewed from a third vantage point, it is an object of the present invention to provide a method for installing at least one transducer to achieve optimum operation from the transducer as it measures changes in distances between itself and a target area of a machine, the steps including: providing a base plate; providing a sliding plate; coupling at least the one transducer to the sliding plate; coupling the sliding plate to the base plate; mounting the base plate to a stationary part of the machine at a location proximate the target area; adjusting the sliding plate to obtain a distance between the transducer and the target area which provides the optimum operation from the transducer; securing the sliding plate to the base plate to preclude further movement of the transducer once the optimum operation of the transducer has been obtained.

Viewed from a forth vantage point, it is an object of the present invention to provide a kit for mounting at least one transducer adjacent a target of a rotor shaft of a machine, the kit including: a base plate including a pair of spaced apart trackways; a sliding plate including a pair of spaced apart channels and a transducer mounting area in which at least the one transducer is mounted; whereby the channels of the sliding plate ride on the trackways of the base plate to precisely position at least the one transducer adjacent the target of the rotor of the machine.

These and other objects will be made manifest when considering the following detailed specification when taken in conjunction with the appended drawing figures.

DESCRIPTION OF PREFERRED EMBODIMENTS

Figure 1:
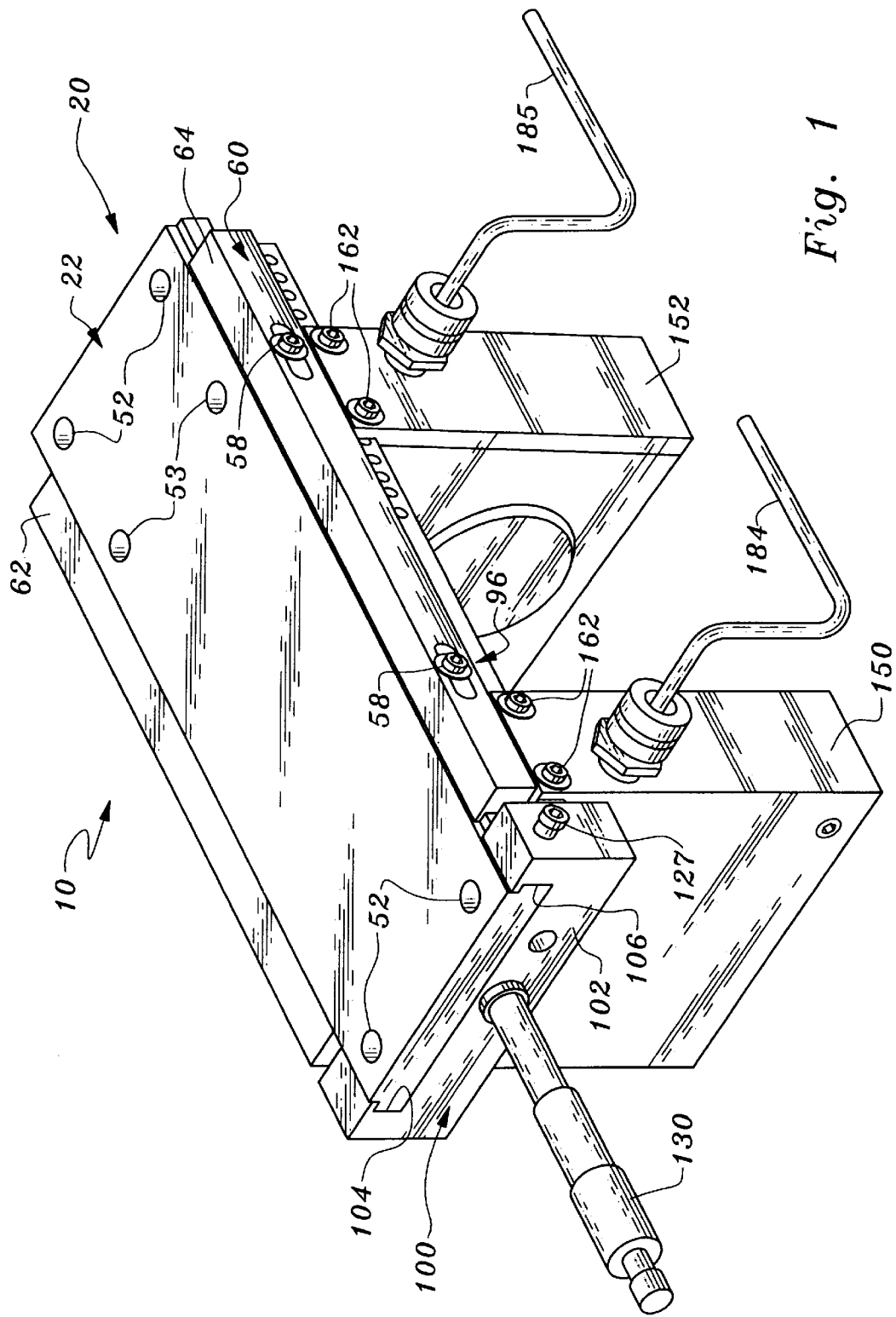
FIG. 1 is a perspective view from a side and an end of a mounting apparatus according to the present invention.
Figure 2:
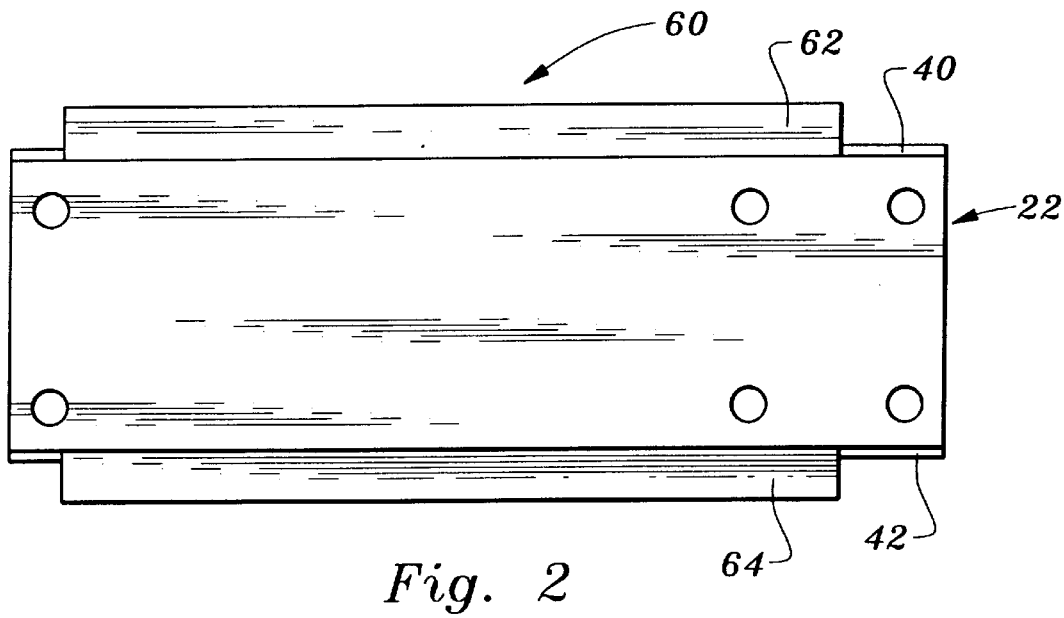
FIG. 2 is a top plan view of a mounting bracket.
Figure 3:
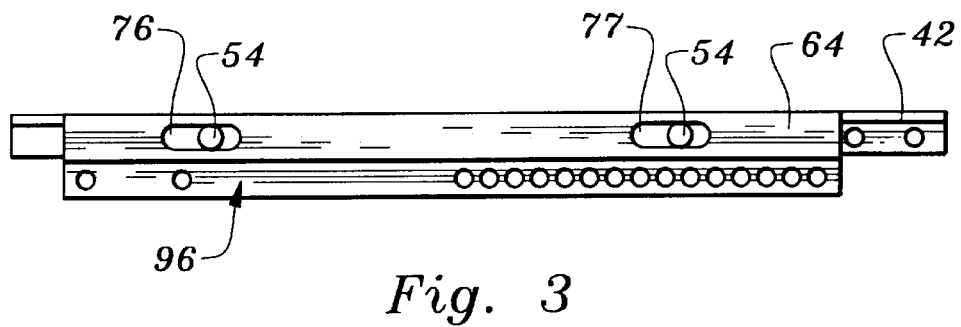
FIG. 3 is a side plan view of the mounting bracket.
Figure 4:
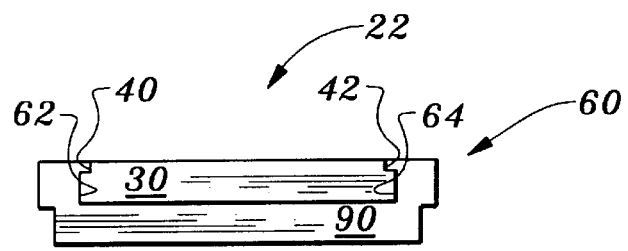
FIG. 4 is an end plan view of the mounting bracket.
Figure 5:
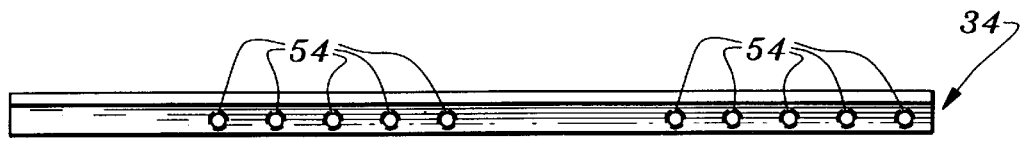
FIG. 5 is a first side plan view of the base plate.
Figure 6:
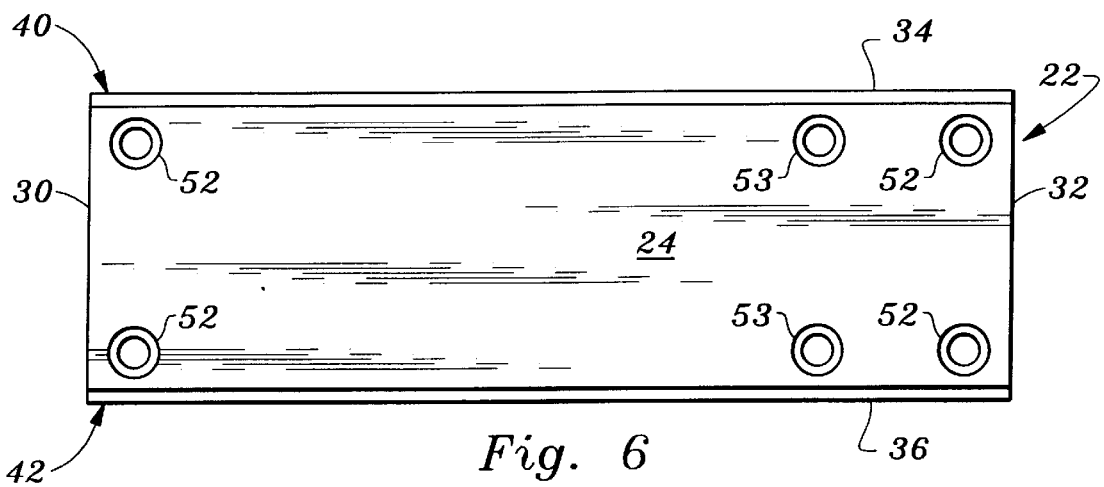
FIG. 6 is a top plan view of the base plate of the mounting bracket.
Figure 7:
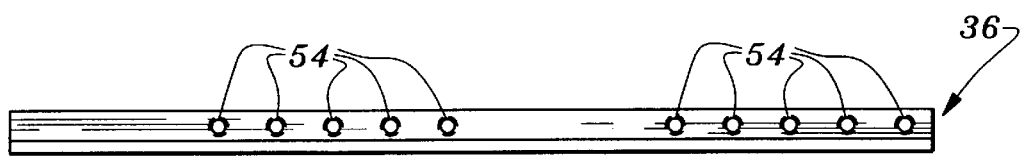
FIG. 7 is a second side plan view of the base plate.

Considering the drawings, wherein like reference numerals denote like parts throughout the various drawing figures, reference numeral 10 is directed to a transducer mounting apparatus according to the present invention.

In its essence, and referring to FIG. 1 through 4, the transducer mounting apparatus 10 includes a two piece mounting bracket 20 and a verification device 100. The two piece mounting bracket 20 includes a base plate 22 and a sliding plate 60. The sliding plate 60 includes a pair of spaced apart opposed channels 62, 64 and a support means 80 which supports at least one transducer 150. The base plate 22 includes a pair of the spaced apart trackways 40, 42 in which the channels of the sliding plate 60 ride on when the sliding plate 60 is slideably coupled to base plate 22. The coupling of the channels 62, 64 of the sliding plate 60 with the trackways 40, 42 of the base plate 22 allow the sliding plate 60 and at least the one transducer 150 to be slid as a single unit when in an unlocked mode. Thus, the sliding plate 60 slides with precision on the base plate 22 thereby making it easy to move at least the one transducer 150 to provide field calibration and verification of the transducer 150 via the verification device 100.

The verification device 100 includes a verification bracket 102 and a micro-measuring means 130. The verification bracket 102 includes a pair of opposed bracket channels 104, 106 which are complemental in shape to the sliding plate channels 62, 64 but are abbreviated in longitudinal length. The verification bracket 102 when coupled to the base plate 22 via the pair of bracket channels 104, 106 employs micro-measuring means 130 operatively coupled to the bracket 102 to precisely discern the displacement of at least the one transducer 150 mounted to the sliding plate 60 with respect to the verification bracket 102 and a target to be monitored. In addition, the verification device 100 allows the correct operation of at least the one transducer 150 to be verified during installation and periodically thereafter.

Figure 8:
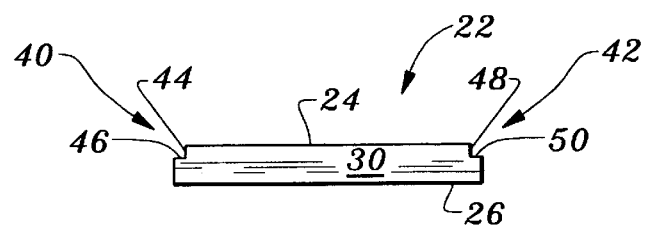
FIG. 8 is an end plan view of the base plate.
Figure 9:
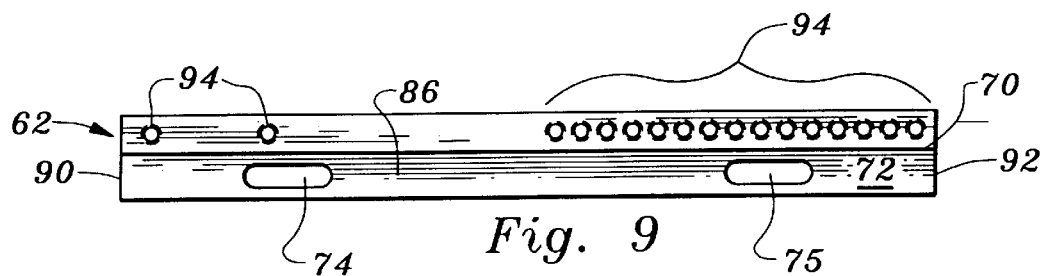
FIG. 9 is a first side plan view of a sliding plate of the mounting bracket.
Figure 10:
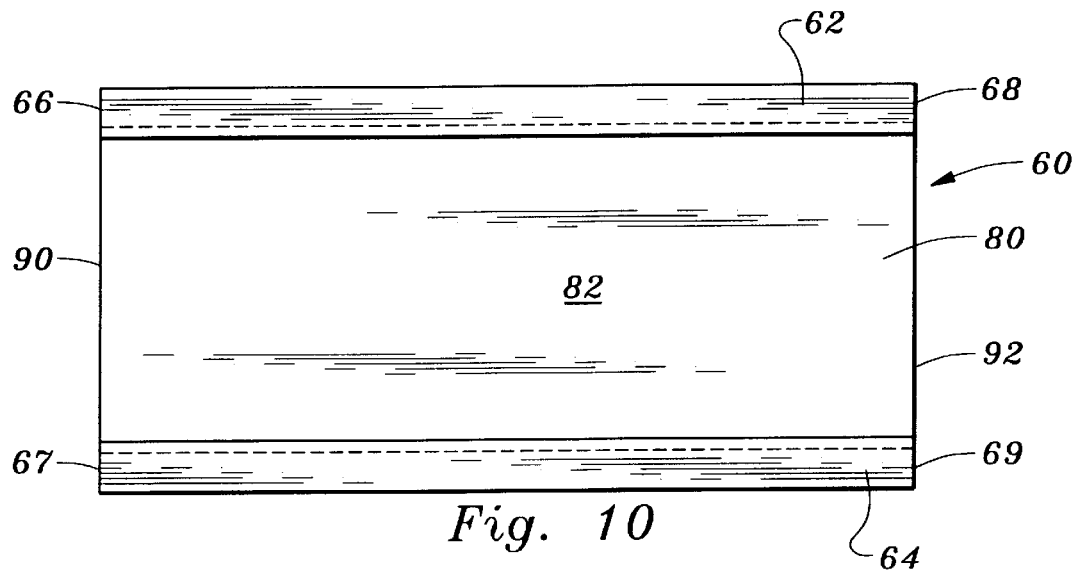
FIG. 10 is a top plan view of the sliding plate of the mounting bracket.
Figure 11:
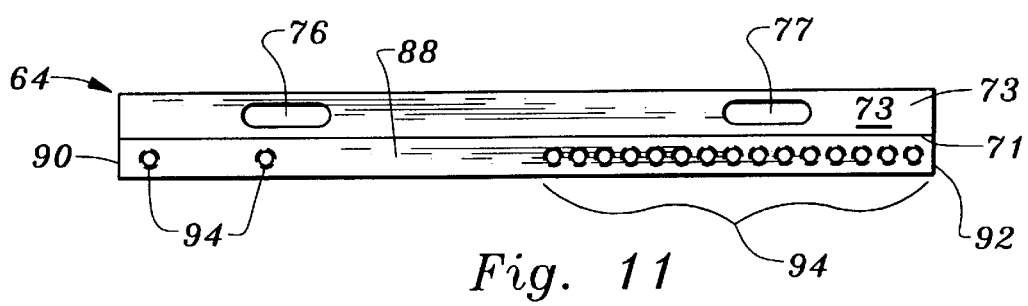
FIG. 11 is a second side plan of the sliding plate of the mounting bracket.
Figure 12:
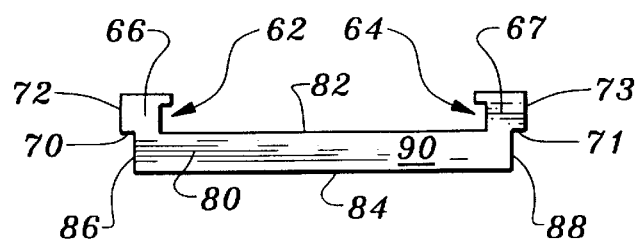
FIG. 12 is an end plan view of the sliding plate.

More specifically and referring to FIGS. 5 through 8, the base plate 22 is preferably a construct of a generally rectangular elongate shape having a substantially uniform "T"-shaped cross-sectional area (please see FIG. 8). The base plate 22 includes a substantially planar upper surface 24 spaced from a substantially planar lower surface 26 and a periphery defined by a plurality of side surfaces extending perpendicularly between the upper surface 24 and the lower surface 26. The periphery is specifically defined by four side surfaces which include a pair of spaced apart parallel latitudinal side surfaces 30, 32 and a pair of spaced apart parallel longitudinal side surfaces 34, 36. A longitudinally extending notch is disposed at each junction or edge between the upper surface 24 and each longitudinal side surfaces 34, 36. Thus, forming a pair of parallel spaced apart trackways 40, 42.

Preferably, the trackways 40, 42 are in the form of longitudinally extending outwardly turned L-shaped notches integrally formed into areas of the base plate 22 where the upper surface abuts (transitions into) the longitudinal side surfaces 34, 36. Thus, the integrally formed trackway 40 is defined by a pair of longitudinally extending sidewalls 44, 46 which respectively downwardly and outwardly extend from the upper surface 24 of the base plate 22. Similarly, the integrally formed trackway 42 is defined by a pair of longitudinally extending sidewalls 48, 50 which respectively downwardly and outwardly extend from the upper surface 24 of the base plate 22. Thus, the trackways 40, 42 are defined by a pair of linear extending, spaced apart and parallel L-shaped notches.

The base plate 22 is provided with a plurality of mounting holes 52 which extend from the upper surface 24 and on through the lower surface 26 of the base plate 22. The base plate 22 is provided with two sets of holes 52 having two holes per set disposed adjacent the latitudinal side surfaces 30, 32. The holes are used for a standard installation of the base plate 22. In addition, an extra set of holes 53 are preferably disposed inboard to the holes 52 adjacent the latitudinal side surface 32. The extra set of holes 53 are for use in the case where the base plate 22 needs to be cut down to accommodate a space restriction.

The base plate 22 is also provided with a plurality of threaded blind bores 54 which extend through the longitudinal side surfaces 34, 36 and on into the base plate 22. Preferably, there are four sets of threaded blind bores 54 having five bores per set. Each longitudinal side surface 34, 36 preferably includes two sets of blind bores 54 disposed in the same spaced apart relationship with one another and having the individual bores disposed at equidistance with respect to one another.

Referring to FIGS. 9 through 12, the sliding plate 60 includes a pair of longitudinally extending opposed channels 62, 64 rigidly maintained at a spaced apart relation and in parallel with respect to one another by an integrally formed medial support means 80. The support means 80 includes a substantially planar top surface 82 spaced from and parallel to a substantially planar bottom surface 84. A pair of parallel, spaced apart longitudinally extending outer surfaces 86, 88 and a pair of parallel, spaced apart latitudinal outer or end surfaces 90, 92 define a periphery of the medial support means 80. The latitudinal end surface 90 transitions into a pair of channel end surfaces 66, 67 of the pair of longitudinally extending channels 62, 64. Likewise, the latitudinal end surface 92 transitions into a pair of end surfaces 68, 69 of the pair of longitudinally extending channels 62, 64 thereby defining the latitudinal periphery or ends of the sliding plate 60.

Each longitudinally extending outer surface 86, 88 of the support means 80 transitions into an outer underside 70, 71 of each respective channel 62, 64 and diverge away from the longitudinally extending outer surfaces 86, 88. The underside 70, 71 then respectively transitions into a pair of longitudinally extending outer channel surfaces 72, 73. Therefore, the longitudinally extending outer surfaces 86, 88 of the support means 80 and the longitudinally extending outer channel surfaces 72, 73 define the longitudinal periphery of the sliding plate 60.

A plurality of threaded blind bores 94 are disposed through each of the longitudinally extending outer surfaces 86, 88 and into the medial support means 80. Preferably, the blind bores 94 are disposed in a pattern which provides a plurality of bores 94 to be disposed adjacent both ends 90, 92 of the sliding plate 60. In addition, a first pair of spaced apart oval openings 74, 75 are disposed through the channel 62 via the outer channel surface 72 and a pair of spaced apart oval openings 76, 77 are disposed in the channel 64 via the second outer channel surface 73. Thus, the oval openings 74, 75, 76 and 77 are in a pattern which provides open communication with the blind bores 54 disposed on each longitudinal side wall 34, 36 of the base plate 22 when the sliding plate is slideably coupled thereto (please see FIG. 3).

Figure 13:
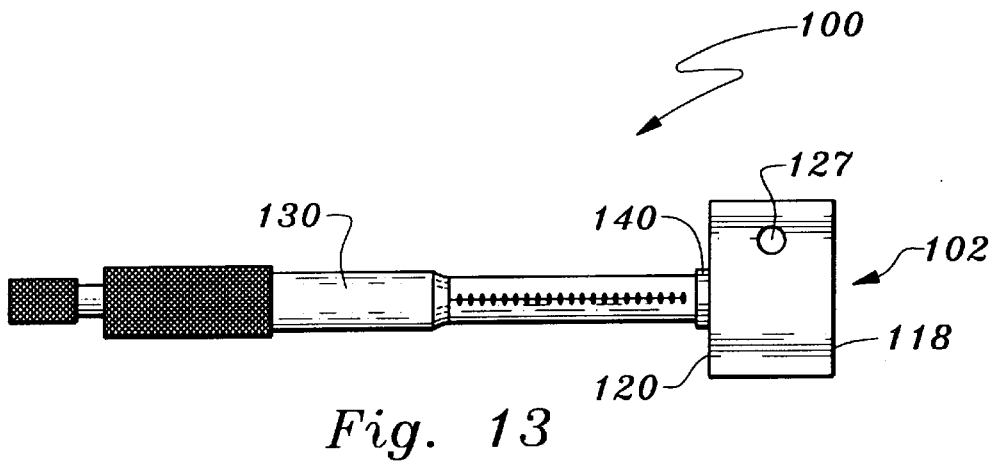
FIG. 13 is a side view of a verification device.

Referring to FIG. 13, the verification device 100 includes a verification bracket 102 and a micro-measuring means 130. Preferably, the micro-measuring means 130 is a spindle micrometer with either a 0 to 2 inch or a 0 to 50 mm range.

Figure 14:
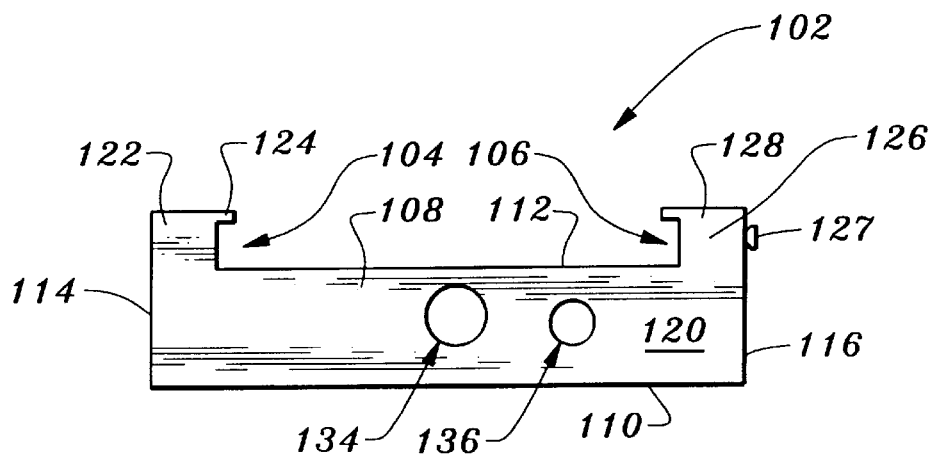
FIG. 14 is a front plan view of a verification bracket of the verification device.
Figure 15:
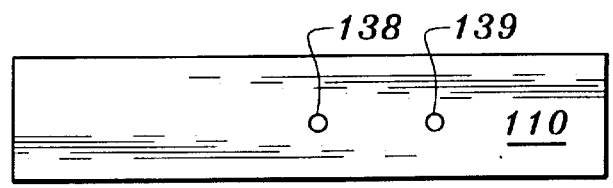
FIG. 15 is a bottom plan view of the verification bracket.

Referring to FIGS. 14 and 15, the verification bracket 102 includes a pair of opposed channels 104, 106 rigidly separated by an integrally formed centralized support means 108. The verification bracket 102 includes a substantially planar bottom side 110 which is parallel to and spaced from a substantially planar top side 112. In addition, the bracket 102 includes a pair of spaced apart substantially planar outer sides 114, 116 and a substantially planar front side 118 and rear side 120. Channel 104 is formed by sidewalls 122 and 124 which respectively extend upwardly and inwardly from the top side 112 of the verification bracket 102. Similarly, channel 106 is formed by sidewalls 126 and 128 which respectively extend upwardly and inwardly from the top side 112 of the verification bracket 102. Thus, the verification bracket channels 104, 106 are complemental in shape to the sliding plate channels 62, 64 but are abbreviated in longitudinal length.

A measuring means bore 134 is disposed through the verification bracket 102 via the rear and front sides 118, 120 for receiving the micro-measuring means 130. In addition, a rod may be passed through the guide bore 136 to assist in the movement of the sliding plate 60.

Figure 16:
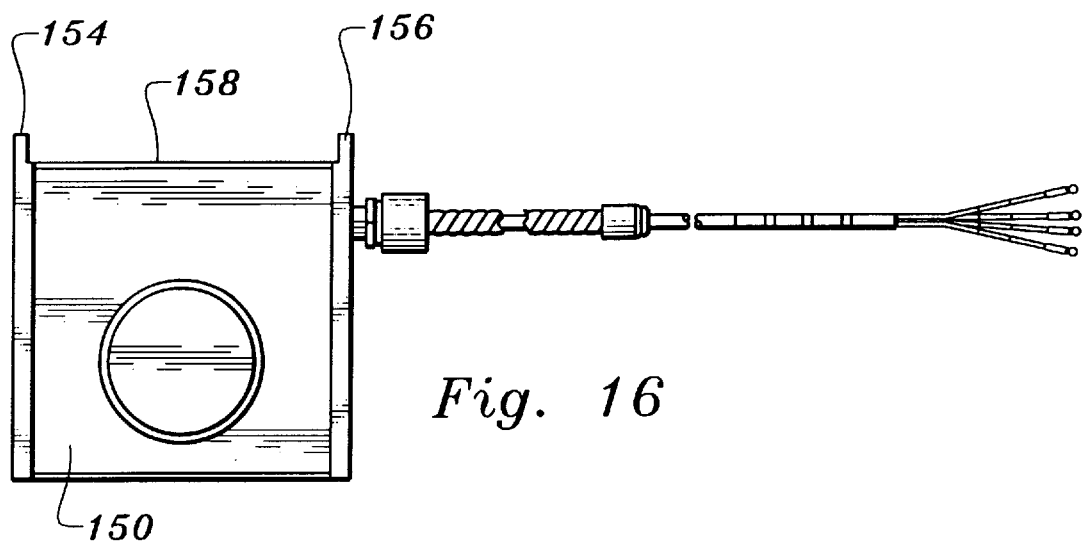
FIG. 16 is a front plan view of a transducer.
Figure 17:
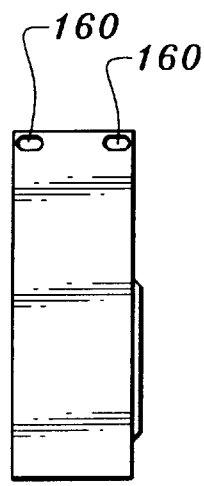
FIG. 17 is a side view of the transducer.

Referring to FIGS. 1 and 16, each transducer 150, 152 includes a pair of spaced apart flanges 154, 156. Preferably, the flanges 154, 156 perpendicularly extend away from a top surface 158 of each transducer 150, 152 and are provided with a set of openings 160 (FIG. 17) such that connectors 162 can slide through and couple with the threaded bores 94 of the support means 80. Note that when the transducers 150, 152 are operatively coupled to a receiving area 96 of the sliding plate 60 they do not increase the overall footprint of the mounting bracket 20.

Figure 18:
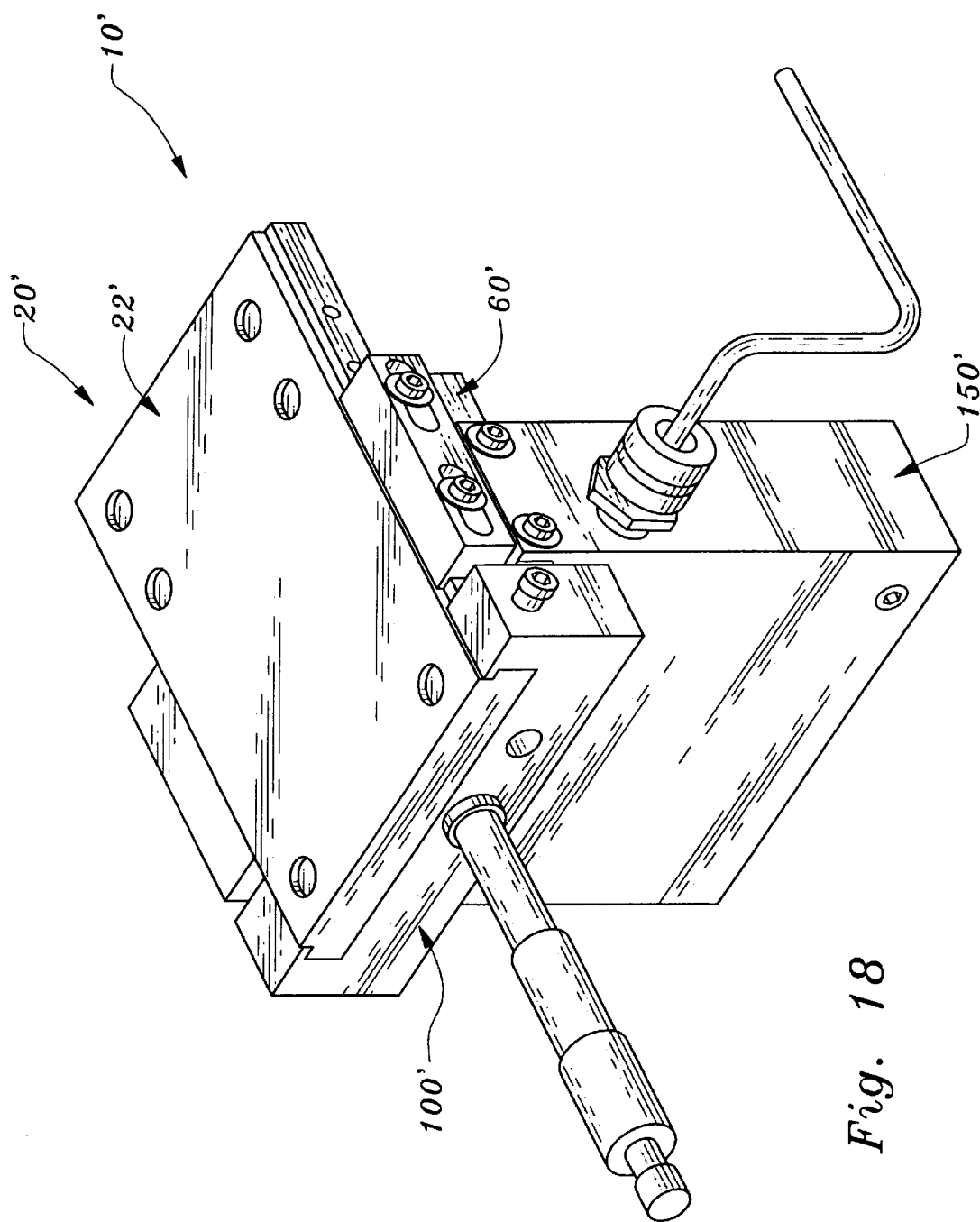
FIG. 18 is a perspective view from a side and an end of a first alternative embodiment of the mounting apparatus shown in FIG. 1.

Referring to FIG. 18, an alternative transducer mounting apparatus 10' is shown supporting a single transducer 150'. The transducer mounting apparatus 10' is substantially identical to the transducer mounting apparatus 10 with the main exception of having an abbreviated base plate 22' and sliding plate 60'. A verification device 100' is substantially identical to the verification device 100.

Therefor, the transducer mounting apparatus 10 and 10' accommodate a variety of mounting orientations. For example, when observing a "target" such as a collar or ramp of a shaft of a steam turbine the transducer mounting apparatus 10 and 10' accommodate mounting arrangements which include: 1) two complementary transducers observing opposite sides of the collar, 2) two transducers observing one side of the collar, and 3) two transducers observing separate ramps of the shaft.

Figure 19:
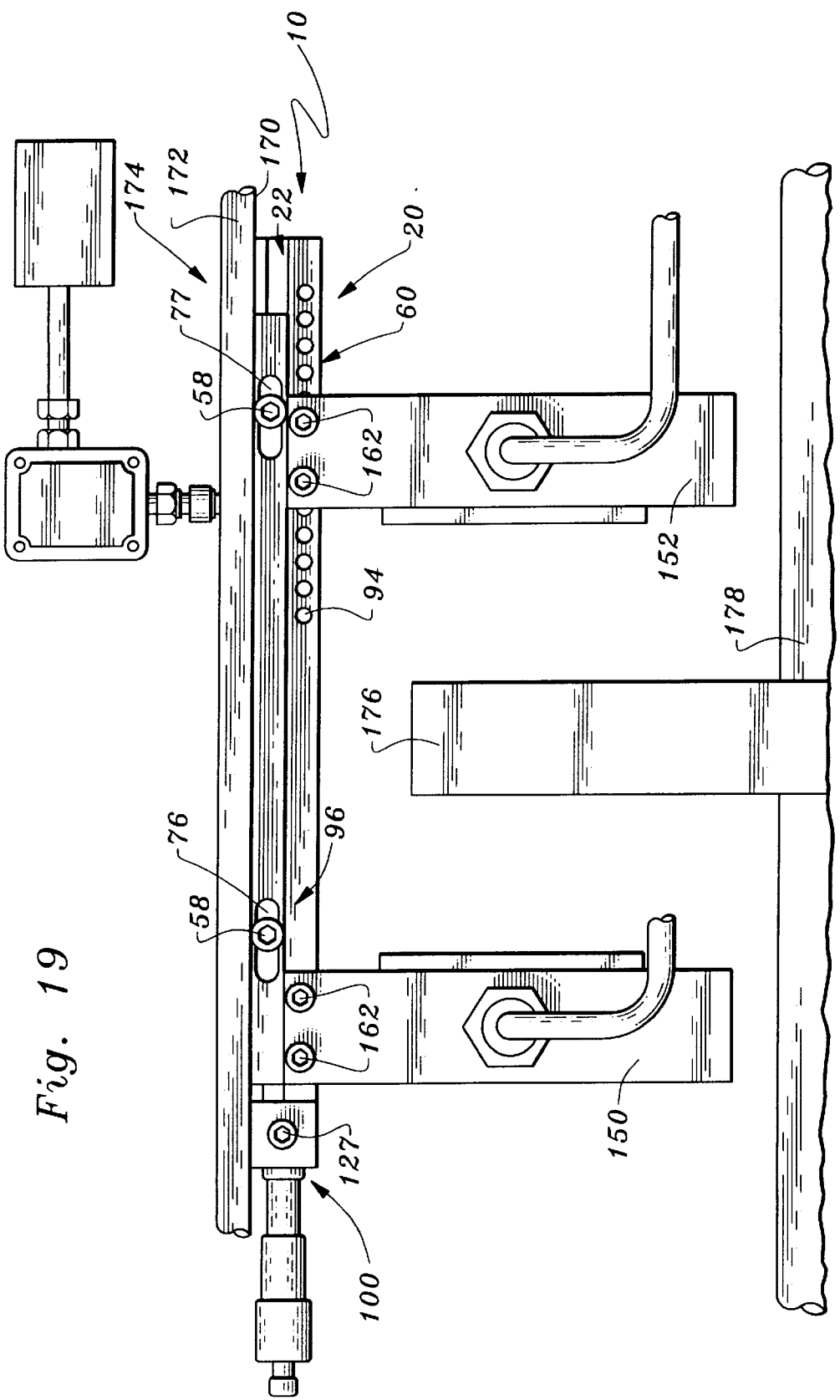
FIG. 19 is a side plan view of the mounting apparatus coupled to an interior of a machine casing.

In use and operation, and referring to FIGS. 1 and 19, the mounting bracket 20 is, for example, operatively coupled to an interior 170 of a machine casing 172. Preferably, four bolts (not shown) pass through the mounting holes 52 of the base plate 22 to rigidly mount the base plate 22 to the interior 170 of the machine casing 172 of a machine 174 such that the base plate 22 is juxtaposed to a "target" or collar 176 of a rotor shaft 178 of the machine 174.

The transducers 150, 152 are coupled to the mounting bracket 20 and located on each side of the collar 176 and adjacent thereto. Specifically, the transducers 150, 152 are coupled to a receiving area 96 of the support means 80 of the sliding plate 60 by connectors 162 passing through the openings 160 (see FIG. 17) of the transducers 150, 152 and being received within the threaded blind bores 94 (see FIGS. 9 and 11) of the sliding plate 60. The sliding plate 60 is fastened to the base plate 22 by passing a connector 58 through each oval opening 74, 75, 76 and 77 of the sliding plate 60 such that they are received in threaded bores 54 of the base plate 22.

The mounting bracket 20 is designed such that a plurality of connectors 162 which fasten the transducers 150, 152 to the receiving area 96 of the sliding plate 60 and the connectors 58 which fasten the sliding plate 60 to the base plate 22 can be installed away from the machine 170. Thus, the pair of transducers 150, 152 may be positioned with relationship to one another before ever being installed within the machine 170.

Therefore, the sliding plate 60, the base plate 22 and the transducers 150, 152 may be installed to the interior 170 of the machine casing 172 as a single unit, however, the sliding plate 60 may need to be slid over in one direction or the other to expose the mounting holes 52. Once the base plate bolts have been secured such that the base plate is rigidly retained and the sliding plate can move freely, the verification device 100 can be coupled adjacent one end 30, 32 of the base plate 22 and locked thereto with a lock screw 127.

Figure 20:
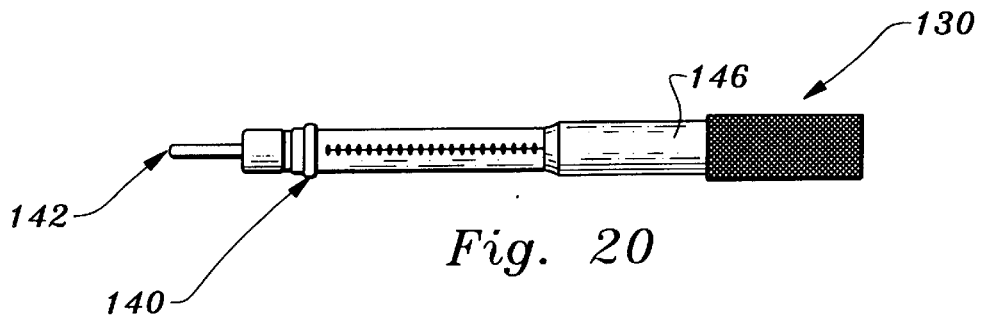
FIG. 20 is a top plan view of a micro-measuring means.
Figure 21:
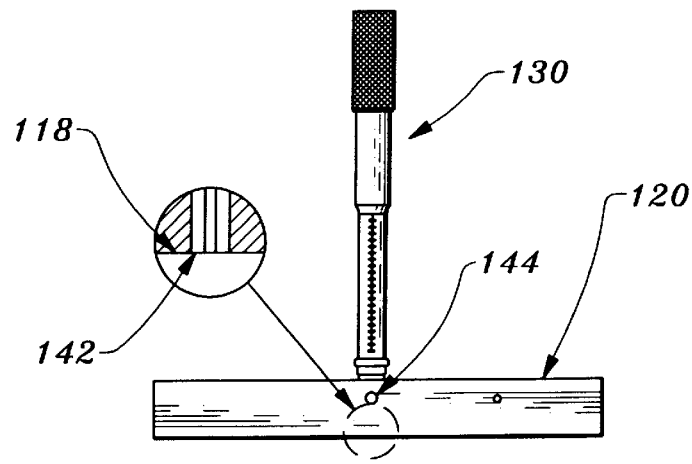
FIG. 21 is a top plan view of the micro-measuring means and a verification bracket.
Figure 22:
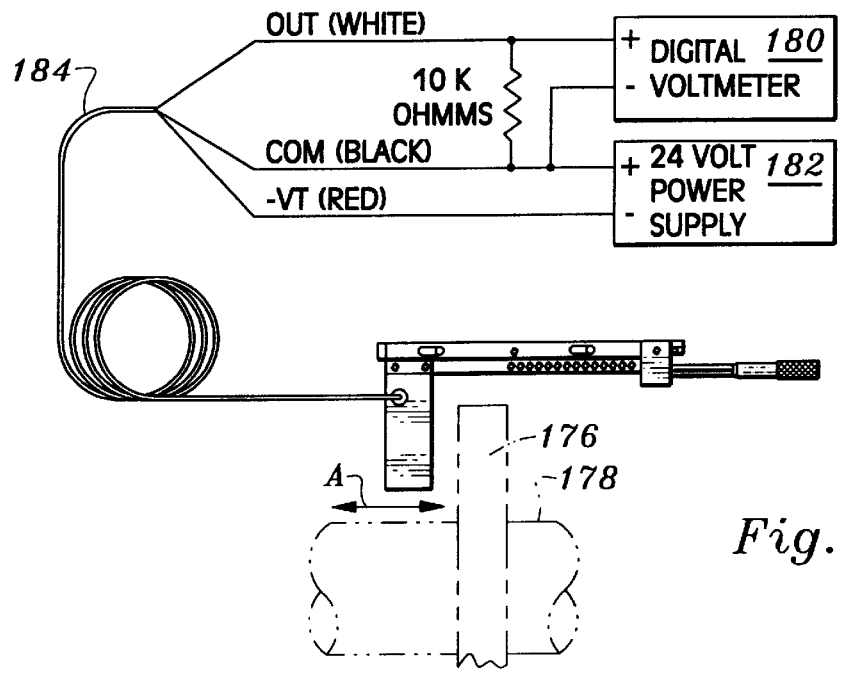
FIG. 22 is a diagrammatic view of the components used in the verification method.

Referring to FIGS. 20 through 22, a digital volt meter 180 and a power supply 182 are operatively coupled to a cable 184, 185 of the transducer 150 or 152 being verified. The micro-measuring means 130 is pre-set according to a predetermined value and then locked in place with a mechanical lock 140. The micro-measuring means 130 is then operatively installed to the verification bracket 102 by being received in the measuring means bore 134. The micro-measuring means is then locked to the verification bracket 102 with a set screw 144 which passes through an opening 138 located in the bottom surface 110 of the bracket 102. Referring to FIG. 21, a contact surface 142 of the micro measuring means 130 is brought into flush abutment with the front side 118 of the verification bracket 102. The spindle 146 of the micro measuring means 130 is then placed in an unlocked position.

Next, the transducer 150 is positioned relative to the collar 176 by moving the sliding plate until the volt meter reads a predetermined voltage, for example, a negative 1.5 volts. Once the transducer is in place, the verification device 100 is operatively coupled to the base plate 22 such that, for example, the front side 118 of the verification device 100 is flush with the latitudinal outer surface 90 of the medial support means 80. The sliding plate 60 is then moved into a first predetermined distance of, for example 35 mm, from the collar 176.

The micro-measuring means 130 is then adjusted according to a first value (N=1) listed in a first row of table 1 shown infra. The sliding plate 60 is then moved back flush with the micro measuring means contact surface 142. The voltage shown on the digital volt meter is then read and recorded in the first (N=1) row under the heading "actual output voltage" of table 1. The three previous steps are then repeated until the voltage values are read and recorded for the "N" values shown in table 1.

The following equations then may be used to calculate the average scale factor (ASF) and the raw deviation from a straight line (DSL raw) values and then these values are preferably entered into the appropriate column of the table.

$$ASF = \frac{Va_{1.25mm} - Va_{29.30mm}}{28.05 \text{ mm}}$$

$$DSL_{RAW} = \frac{Vi_n - Va_n}{0.3937 \text{ V/mm}}$$

Furthermore, the following equation may be used to determine the deviation from a straight line of the overall system (DSL sys). The DSL raw max and the DSL raw min shown in the equation are values determined from the previous measurements and should be entered in table 1.

The last calculation is to adjust the DSL raw values to DSL adjusted values. The following simple equation is used to determine the DSL adjusted values and these values are recorded in the appropriate column of table 1.

$$DSL_{SYS} = \frac{DSL_{RAW MAX} - DSL_{RAW MIN}}{2}$$

$$DSL_{ADJ} = DSL_{RAW} - DSL_{SYS}$$

Once the data is obtained and recorded it may be analyzed to determine a plurality of operating parameters of the transducer. For example, the operation and calibration of each transducer 150, 152 can be verified. In addition, an optimum gap setting may be obtained which assures that the spacing between the collar 176 and either transducer 150, 152 remains in a linear range of the transducers 150, 152 for providing accurate and reliable measurements during machine operation.

Once the operation of the transducers have been verified and the transducer are located at an optimum gap setting they are rigidly secured to the base plate 22 via connectors 58.

Figure 23:
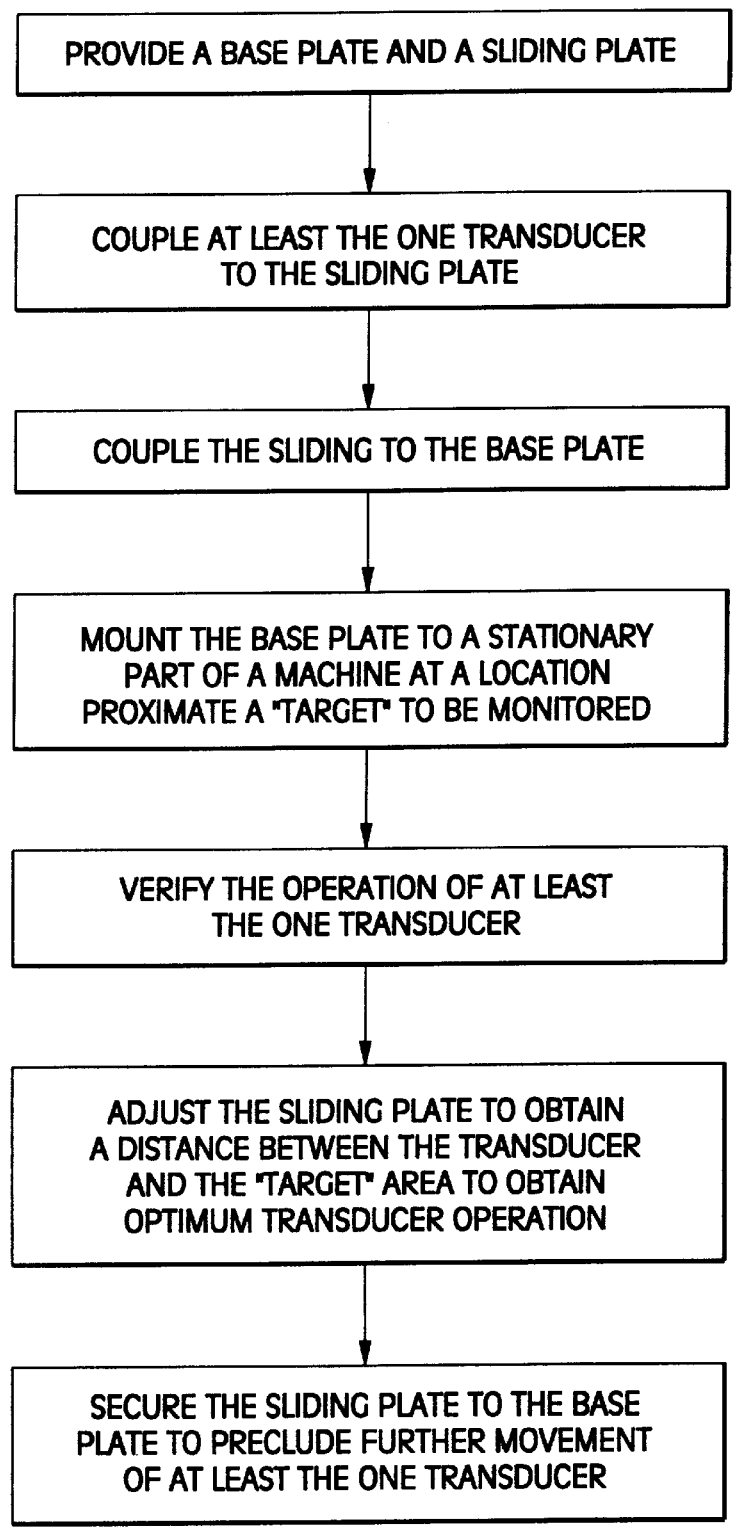
FIG. 23 is a general block diagram of the verification method.

FIG. 23 is a general block diagram of the above delineated method.

TABLE 1

| n | Actual Gap Values, mm | Micrometer Adjusted Values, mm | Actual Output Voltages, $V_a$ Vdc | Ideal Output Value, $V_i$ Vdc | Average Scale Factor, ASF V/mm | Unadjusted Value, $DSL_{RAW}$ mm | Adjusted Value, $DSL_{ADJ}$ mm |
|---|---|---|---|---|---|---|---|
| 1 | 29.30 | 20.70 | — | −12.543 | — | — | — |
| 2 | 26.75 | 23.25 | — | −11.539 | — | — | |
| 3 | 24.20 | 25.80 | — | −10.535 | — | — | |
| 4 | 21.65 | 28.35 | — | −9.531 | — | — | |
| 5 | 19.10 | 30.90 | — | −8.528 | — | — | |
| 6 | 16.55 | 33.45 | — | −7.524 | — | — | |
| 7 | 14.00 | 36.00 | — | −6.520 | — | — | |
| 8 | 11.45 | 38.55 | — | −5.516 | — | — | |
| 9 | 8.90 | 41.10 | — | −4.512 | — | — | |
| 10 | 6.35 | 43.65 | — | −3.508 | — | — | |
| 11 | 3.80 | 46.20 | — | −2.504 | — | — | |
| 12 | 1.25 | 48.75 | — | −1.500 | — | — | |

NOTE: *The micrometer adjusted values are used because the spindle micrometer's orientation. If the spindle micrometer is orientated in the opposite direction, then the actual Gap values can be used.

Moreover, having thus described the invention, it should be apparent that numerous structural modifications and adaptations may be resorted to without departing from the scope and fair meaning of the instant invention as set forth hereinabove and as described hereinbelow by the claims.

We claim:

1. A transducer mounting bracket for adjustable mounting a transducer adjacent a target disposed on a rotating shaft of a machine, said bracket comprising in combination:

a base plate including means for rigidly mounting said base within an interior of a housing of the machine and adjacent the target;

said base plate including a pair of substantially parallel spaced apart trackways longitudinally extending in a plane substantially parallel to the rotating shaft of the machine;

an adjustable sliding plate including a pair of substantially parallel spaced apart channels slideably coupled to said trackways and longitudinally extending in a plane substantially parallel to the rotating shaft of the machine;

said sliding plate including a longitudinally extending transducer receiving area for rigidly supporting at least one transducer;

wherein the transducer rigidly supported by said adjustable sliding plate is axially moveable with respect to the target being monitored by the transducer for axially positioning the transducer prior to locking said sliding plate to said base plate via a fastening means.

2. The transducer mounting bracket of claim 1 wherein said base plate is a substantially planar solid defined by a top surface, a bottom surface and a periphery perpendicularly extending between said top and bottom surfaces.

3. The transducer mounting bracket of claim 2 wherein said periphery of said base plate includes a pair of spaced apart parallel latitudinal side surfaces and a pair of spaced apart parallel longitudinal side surfaces.

4. The transducer mounting bracket of claim 3 wherein said base plate includes said pair of substantially parallel spaced apart trackways integrally formed into said base plate.

5. The transducer mounting bracket of claim 4 wherein each said trackway is disposed at an edge between said upper surface and each said longitudinal side surface.

6. The transducer mounting bracket of claim 5 wherein each said trackway includes a pair of longitudinally extending sidewalls which downwardly and outwardly extend from said top surface of said base plate thereby defining each said trackway as a longitudinally extending outwardly turned L-shaped notch.

7. The mounting bracket of claim 6 wherein said adjustable sliding plate includes said pair of substantially parallel spaced apart channels which slideably engage said trackways of said base plate.

8. The mounting bracket of claim 7 wherein said adjustable sliding plate includes a medial support means which rigidly maintains the spaced apart relationship between said channels.

9. The mounting bracket of claim 8 wherein each said channel includes an upwardly and inwardly diverging wall emanating from each longitudinal edge of a top surface of said support means.

10. The mounting bracket of claim 9 wherein said upwardly and inwardly diverging wall of each said channel defines an inverted substantially "L"-shaped area longitudinally extending along each said longitudinal edge of said top surface.

11. The mounting bracket of claim 10 wherein said medial support means includes a transducer receiving area inwardly staggered from and below each said channel whereby the transducer may be mounted to said receiving area without increasing the overall footprint of the mounting bracket.

* * * * *